(12) United States Patent
Grechanik et al.

(10) Patent No.: US 8,527,953 B2
(45) Date of Patent: Sep. 3, 2013

(54) ASSESSMENT SYSTEM FOR CHOOSING MAINTENANCE APPROACHES FOR GUI-DIRECTED TEST SCRIPTS

(75) Inventors: Mark Grechanik, Chicago, IL (US);
Qing Xie, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 598 days.

(21) Appl. No.: 12/813,300

(22) Filed: Jun. 10, 2010

(65) Prior Publication Data

US 2010/0318970 A1    Dec. 16, 2010

Related U.S. Application Data

(60) Provisional application No. 61/186,331, filed on Jun. 11, 2009, provisional application No. 61/186,366, filed on Jun. 11, 2009.

(51) Int. Cl.
*G06F 9/44*    (2006.01)
*G06F 9/45*    (2006.01)

(52) U.S. Cl.
USPC .......................... 717/124; 717/125; 715/762

(58) Field of Classification Search
USPC .................. 717/124–129; 715/762–763
See application file for complete search history.

(56) References Cited

U.S. PATENT DOCUMENTS

| | | | | |
|---|---|---|---|---|
| 6,384,843 B1 * | 5/2002 | Harel | ............... | 715/762 |
| 6,708,327 B1 * | 3/2004 | Aliphas | ............... | 717/125 |
| 6,944,848 B2 * | 9/2005 | Hartman et al. | ............... | 717/124 |
| 7,302,675 B2 * | 11/2007 | Rogers et al. | ............... | 717/125 |
| 7,490,319 B2 * | 2/2009 | Blackwell et al. | ............... | 717/124 |
| 7,493,592 B2 * | 2/2009 | Karatal et al. | ............... | 717/105 |
| 7,506,315 B1 * | 3/2009 | Kabadiyski et al. | ............... | 717/128 |
| 7,610,578 B1 * | 10/2009 | Taillefer et al. | ............... | 717/124 |
| 7,614,043 B2 * | 11/2009 | Ognev et al. | ............... | 717/126 |
| 7,793,267 B2 * | 9/2010 | Davison et al. | ............... | 717/128 |
| 7,814,427 B2 * | 10/2010 | Cook et al. | ............... | 715/763 |
| 8,122,366 B2 * | 2/2012 | Harrold et al. | ............... | 715/762 |
| 8,171,457 B2 * | 5/2012 | Dimpsey et al. | ............... | 717/125 |
| 8,185,877 B1 * | 5/2012 | Colcord | ............... | 717/127 |
| 8,336,029 B1 * | 12/2012 | McFadden et al. | ............... | 717/124 |

OTHER PUBLICATIONS

Lai et al, "The object FMA based test case generation approach for GUI software exception testing", IEEE, pp. 717-723, 2011.*
Memon, "Automatically reparing event sequence based GUI test suits for regression testing", ACM Trans. on Software Eng. & Methodology, vol. 18. No. 2, article 4, pp. 1-36, 2008.*
Strecker et al, "Accounting for defect characteristic in evaluations of testing techniques", ACM Trans. on Software Eng. & Methodology, vol. 21. No. 3, article 17, pp. 1-43, 2012.*
Chuang et al, "User behavior augmented software testing for user centered GUI", ACM RACS, pp. 200-208, 2011.*

(Continued)

*Primary Examiner* — Anil Khatri
(74) *Attorney, Agent, or Firm* — Brinks Hofer Gilson & Lione

(57) ABSTRACT

A graphical user interface (GUI) tool analysis system helps determine whether to purchase or license automated testing tools. The system provides guidance, e.g., to test managers, for making decisions on expenditures for the automated test tools. As a result, the test managers need not make purchasing decisions ad hoc, based on their own personal experience and perceived benefits of implementing a tool based automatic testing approach versus a manual testing approach.

17 Claims, 12 Drawing Sheets

(56) References Cited

OTHER PUBLICATIONS

International Preliminary Report on Patentability issued Dec. 22, 2011 for co-pending PCT Application No. PCT/US2010/038171.

Written Opinion of the International Searching Authority mailed Aug. 12, 2010 for co-pending PCT Application No. PCT/US2010/038171.

Avriel, Mordecai, "Nonlinear Programming Analysis and Methods", Dover Publications, Inc., 2003, Complete Book.

Boyd, Stephen, et al., "Convex Optimization", Cambridge University Press, 2004, Complete Book.

Elster, Karl-Heinz, editor, "Modern Mathematical Methods of Optimization", Adademie Verlag, Mathematical Topics, vol. 1, 1993, Complete Book.

Nocedal, Jorge, et al., "Numerical Optimization", Second Edition, Springer Science and Business Media, LLC, 2006, Complete Book.

Papalambros, Panos Y., et al., Principles of Optimal Design Modeling and Computation, Second Edition, Cambridge University Press, 2000, Complete Book.

Rowe, W.B., et al., "Optimization of externally pressurized bearings for minimum power and low temperature rise", Tribology, Aug. 1970, pp. 153-157.

Yang, Xin-She, "Introduction to Mathematical Optimization From Linear Programming to Metaheuristics", Cambridge International Science Publishing, 2008, Complete Book.

\* cited by examiner (a) Manual Approach (b) Tool-based Approach a. Manual approach.

b. Tool-based approach.

a. Manual approach.

b. Tool-based approach.

```
currentNode = startNode;
loop do
    L = NEIGHBORS(currentNode);
    nextEval = INF;
    nextNode = NULL;
    for all x in L
        if (EVAL(x) < nextEval)
        nextNode = x;
        nextEval = EVAL(x);
    if nextEval >= EVAL(currentNode)
    //Return current node since no better neighbors exist
        return currentNode;
    currentNode = nextNode;
```

Figure 11

$$TC = MIN \begin{cases} MTR * MTT * NMT \quad \text{(Manual)} \\ \\ (TSCT + TSMT) * NTEN * ETER + NTL * TSCT * NTEN + TSRT * NTL \\ \quad \text{(Automated Testing with Manual scripts maintenance)} \\ \\ (TSCT + \dfrac{TSMT}{MS}) * NTEN * (NTER + NTL) + TSRT * NTL \\ \quad \text{(Automated Testing with tool based scripts maintenance)} \end{cases}$$

Figure 12

ASSESSMENT SYSTEM FOR CHOOSING MAINTENANCE APPROACHES FOR GUI-DIRECTED TEST SCRIPTS

PRIORITY CLAIM

This application claims the priority benefit of Provisional Patent Application Ser. Nos. 61/186,331, filed on Jun. 11, 2009, and 61/186,366, filed Jun. 11, 2009, both of which are incorporated herein by reference in their entireties.

BACKGROUND OF THE INVENTION

1. Technical Field

This disclosure relates to black-box testing of Graphical User Interface (GUI)-based Applications (GAPs).

2. Related Art

Manual black-box testing of GAPs is tedious and laborious, since nontrivial GAPs contain hundreds of GUI screens and thousands of GUI objects. Test automation plays a key role in reducing the high cost of testing GAPs. In order to automate this process, test engineers write programs using scripting languages (e.g., Java™ Script and VB™ Script), and these programs (test scripts) mimic users by performing actions on GUI objects of these GAPs using some underlying testing frameworks. Extra effort put in writing test scripts pays off when these scripts are run repeatedly to determine if GAPs behave as desired.

Unfortunately, releasing new versions of GAPs with modified GUIs breaks their corresponding test scripts thereby obliterating the benefits of test automation. Consider a situation of a list box replaced with a text box in the successive release of some GAP. Test script statements that select different values in this list box will result in exceptions when executed on the text box. This simple modification may invalidate many statements in test scripts that reference this GUI object. Maintaining test scripts involves changing its code to keep up with changes to their corresponding GAPs.

This and many other similar modifications are typical between successive releases of different GAPs, including such well-known GAPs as Adobe™ Acrobat Reader and Microsoft™ Word. As many as 74% of the test cases become unusable during GUI regression testing, and some evaluations of automated testing have shown that even simple modifications to GUIs result in 30% to 70% changes to test scripts. To reuse these scripts, test engineers should fix them. For example, scores of test engineers need to be employed to fix test scripts both manually and using different testing tools. The annual cost of manual maintenance and evolution of test scripts is enormous, and may run into the tens or hundreds of millions of dollars in large organizations.

Currently, there are two main modes of maintaining test scripts: tool-based and manual. Existing testing tools detect exceptions in test scripts at runtime, i.e., test engineers run these scripts in order to execute statements that reference modified GUI objects. Exceptions interrupt continuous testing and they require human intervention to fix them.

Unlike compilers that check unit tests against the program code, test scripts are based on different type systems than GAPs that they test. As it turns out, multiple disparate type systems make GUI testing very difficult. Existing regression testing approaches work in settings where test harnesses are written in the same language and use the same type system as the programs that these harnesses test (e.g., JUnit test harnesses are applied to Java™ programs). In contrast, when testing GAPs two type systems are involved: the type system of the language in which the source code of the GAP is written and the type system of the language in which test scripts are written. When the type of the GUI object is modified, the type system of the test script "does not know" that this modification occurred, thereby aggravating the process of maintaining and evolving test scripts.

As a result, tool-based approaches provide maintenance modes that allow testers to find broken statements in test scripts by executing these statements line-by-line against GAPs. The presence of loops in test scripts make them run for a long time in order to reach statements that should be checked. Test engineers comment out loops, but their modifications may change testing logic and mask broken statements. Finally, commercial testing tools are expensive (e.g., a license for one of the flagship industry tools costs more than $10,000).

On the other hand, manual maintenance of test scripts is popular among test professionals. During manual maintenance testers determine differences between successive release of GAPs and they locate and fix statements in test scripts that are affected by these changes. Since the sizes of test scripts are much smaller than the GAPs that these scripts act upon (e.g., many scripts are smaller than 1KLOC), it is feasible for testers to understand and fix them. In addition, testers are perceived to do a more thorough job of understanding and fixing scripts if they do not rely heavily on tool support. However, some test engineers lack time and necessary skills to understand and fix old scripts, especially if these scripts were created by other engineers.

Currently, testers run test scripts that are written for the previous releases of a GAP on the successive releases of this GAP to determine if these scripts can be reused. The testers may use existing tools that include a script debugger (e.g., QTP from Hewlett Packard™ company). Once a statement that accesses a modified GUI object is reached, the testing platform generates an exception and terminates the execution of the script. The engineer analyzes the exception, fixes the statement, and reruns the script again. This process is repeated until the script runs without throwing any exceptions.

Often it takes a long time until statements that reference changed GUI objects are executed. Test scripts contain loops, branches, and fragments of code that implement complicated testing logic in addition to statements that access GUI objects. Consider a test script that contains a loop with code that reads in and analyzes data from files, computes some result from this data, and inserts it in a GUI object. Computing this result may take hours depending on the sizes of the files. Test scripts often contain multiple computationally intensive loops that are interspersed with statements that access GUI objects. Each time an exception is thrown because of a failure, the results of the execution are discarded, and the script should be rerun after engineers fix this failure. Commenting out loops (when possible) speeds up execution, but it changes the logic of test scripts, and subsequently the quality of repairs.

In addition, existing testing tools provide little information about how to fix failures in test scripts. When a test script is executed against a new version of the GAP, existing tools have no information about changes between GUI objects that lead to exceptions. As a result, test engineers must analyze GUIs manually to obtain this information and relate it to the exceptions, and this is a laborious and intellectually intensive process.

When fixing failures in test scripts manually, testers examine GUIs of two consecutive releases of some GAP to determine what GUI objects are modified. In addition, testers with advanced skills as well as programmers study the source code of GAPs (if it is available) to understand these changes in depth. Learning how GAPs are modified between released versions and relating these changes to statements and operations in test scripts may have a beneficial learning effect on testers. Without relying on tool support, testers are thought to do a more thorough job of finding and fixing failures in test scripts.

It is not clear if the manual approach has definite benefits over the tool-based approach. On one hand, testing tools are expensive and may take a long time to execute scripts to determine what statements are broken because of changes made to GUI objects between successive releases of GAPs. On the other hand, the manual approach requires testers to go over each statement and operation in test scripts to understand what GUI objects they refer to, and it is laborious and expensive.

What is needed is a sound and complete approach. A sound approach ensures the absence of failures in test scripts if it reports that no failures exist, or if all reported failures do in fact exist, and a complete approach reports all failures, or no failures for correct scripts. Both manual and tool-based approaches allow testers to detect some failures that result from modifications of GUI objects, however it is unclear with what degree of precision.

Therefore, a need exists to address the problems noted above and others previously experienced.

SUMMARY

A GUI testing analysis system ("system") determines which approach (manual versus tool-based) is more effective for test personnel and GUI developers to find failures in test scripts. The system may employ a large scale case study (in one example, with forty five professional programmers and test engineers) to empirically assess the productivities for maintaining GUI-directed test scripts using a tool-based versus a manual approach. The system may process and generate statistical evidence that demonstrates that users find more broken test script statements due to changes in GUI objects between successive releases of GAPs and report fewer false positives in test scripts with an automated approach than with a manual approach. The system may calculate a cost benefit ratio based on the assessment. The system may also process and generate statistical evidence that suggests significantly higher productivity with programmers but similar results with experienced test engineers when using the testing tool compared to those who maintained test scripts using the manual approach. The statistical evidence may include a plurality of statistical variables and the correlation among the statistical variables determined as a result of the empirical assessment.

The system may also generate, for any particular organization, a recommendation whether the organization supply programmers with testing tools that help them to fix test scripts faster so that these scripts can unit test software. Based on the correlation determined by the empirical assessment, the system may determine the optimum values of statistical variables through an optimization algorithm. The system may utilize these variables as a basis for determining the recommendation.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 11 shows a pseudo code implementation of the optimization algorithm of FIG. 10.

FIG. 12 shows an evaluation function that the optimization program of FIG. 9 may execute.

DETAILED DESCRIPTION

Figure 1:
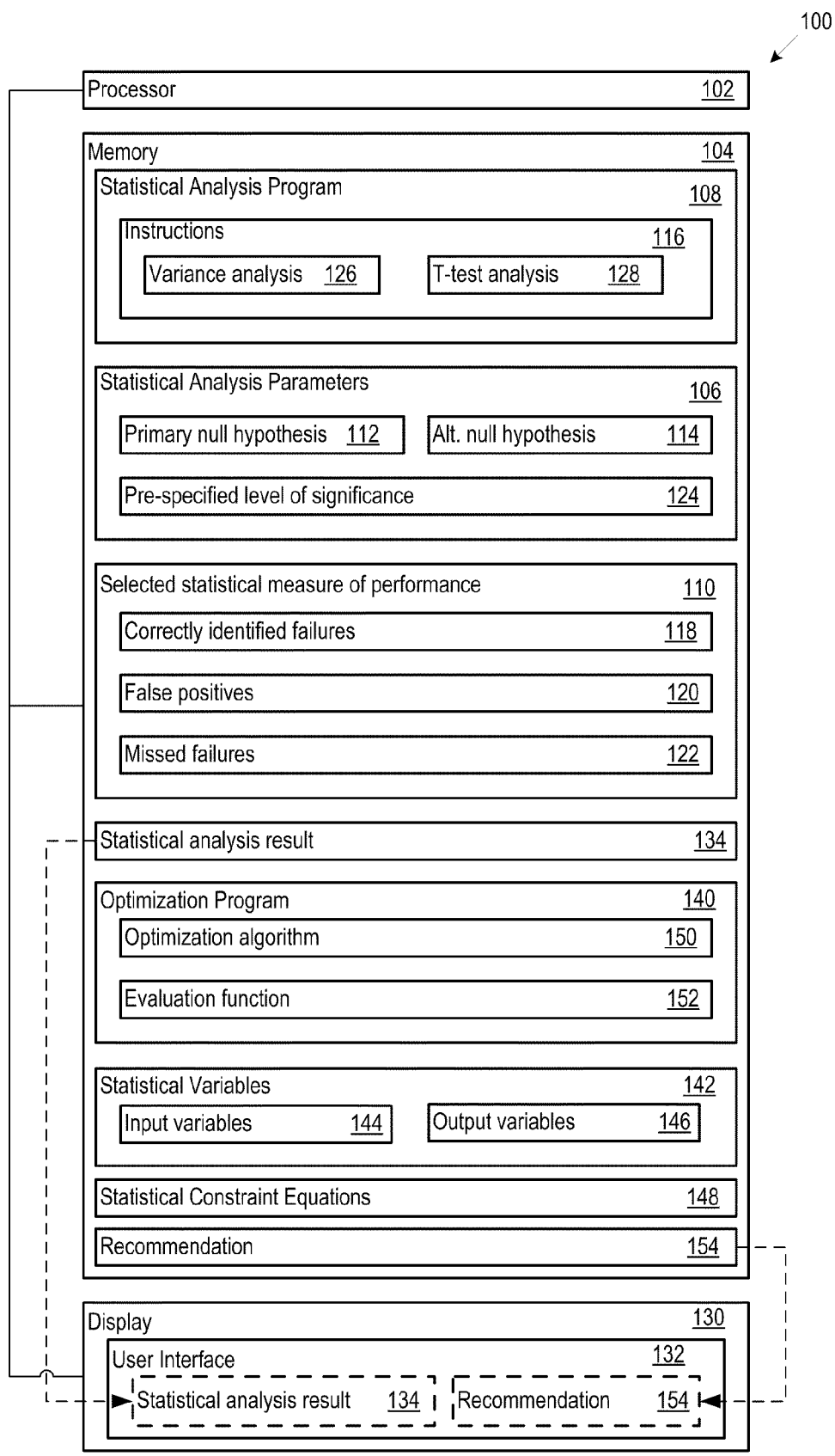
FIG. 1 shows a GUI testing analysis system.

Cost-benefit analysis of the tool-based approach versus the manual approach is complicated. Licenses for tools are expensive. At the same time the time of testers is also expensive. If using testing tools does not result in significant time savings, the cost of tool licenses will increase the cost of testing. It is imperative to understand when using test tools is effective, so that managers can plan test automation for software projects.

Besides test engineers, GUI developers test their code by creating and eventually maintaining test scripts. Since these developers spend major part of their time writing source code of GAPs rather than testing them, managers often think that the purchasing licenses of expensive testing tools for developers will not result in significantly increased savings of their time. On the other hand, the developer's time is more expensive, and it is desirable that they spend their time writing code than fixing test scripts. Testing tools may make developer's work more productive. Thus, the system may analyze, during the cost-benefit analysis, what approach is more effective for programmers as well as testers.

Leasing tools for a short period of time results in a higher cost per hour of usage of these tools, however, the overall cost of ownership is low. If GAPs did not evolve, their test scripts would likely to stay unchanged once created, and leasing testing tools for a short period of time to create these scripts would be economic. However, since test scripts should be maintained on a regular basis, tool licenses should be purchased to reduce the overall cost of ownership. Purchasing more licenses than it is economically required is detrimental for the cost of software projects.

To run test scripts, only one tool license is required; however, if testers maintain test scripts on a regular basis, many tool licenses are needed, one per tester for maintenance tasks.

When testers maintain scripts manually, tool license can be leased for a short period of time to run scripts, and the cost of the ownership of the tool is minimal. On the other hand, it requires significant investment for each tester to maintain scripts with the help of testing tool, since it would mean a purchasing many licenses of testing tools. A trade-off between the cost of the tool licenses and the increase in testing productivity justifies using manual versus tool-based approaches.

In practice, there is no consensus which approach testers and GUI developers should use to maintain test scripts. Test managers make their decisions ad hoc, based on their personal experience and perceived benefits of the tool-based approach versus the manual. Currently, testers use tool-based approaches on an ad-hoc basis, while programmers rarely use GUI-directed test tools for unit testing. As few as only 35% of testers used automated testing tools one year after the tool installation.

The objectives of test automation are, among other things, to reduce the human resources needed in the testing process and to increase the frequency at which software can be tested. Traditional capture/replay tools provide a basic test automation solution by recording mouse coordinates and user actions as test scripts, which are replayed to test GAPs. Since these tools use mouse coordinates, test scripts break even with the slightest changes to the GUI layout.

Modern capture/replay tools (e.g., Quick Test Professional (QTP), Abbot, Selenium, and Rational Functional Tester (RFT) avoid this problem by capturing values of different properties of GUI objects rather than only mouse coordinates. This method is called testing with object maps, and its idea is to reference GUI objects by using unique names in test scripts. Test engineers assign unique names to collections of the values of the properties of GUI objects, and they use these names in test script statements to reference these objects.

In testing with object maps, the pairs (uname, {<p,v>}), where {<p, v>} is the set of the pairs of values v of the properties p of a GUI object, are collected during capture and stored in object repositories (ORs) under the unique name uname. During playback, the references to "uname" in scripts are translated into operations that retrieve {<p,v>} from ORs, and the referenced GUI object is identified on the screen by matching the retrieved values against some or all of its properties. This extra level of indirection adds some flexibility since cosmetic modifications to GUI objects may not require changes to test scripts. Changing the GUI object property values in the OR ensures that the corresponding GUI objects will be identified during playback.

However, many changes still break scripts, for example, changing the type of a GUI object from the list box to the text box. The system defines test script statements that access and manipulate GUI objects as failures if these statements are broken because of modifications made to the referenced GUI objects in the successive releases of GAPs. Test engineers put a lot of efforts in detecting and understanding failures, so that they can fix test scripts to make them work on modified versions of GAPs.

Figure 8:
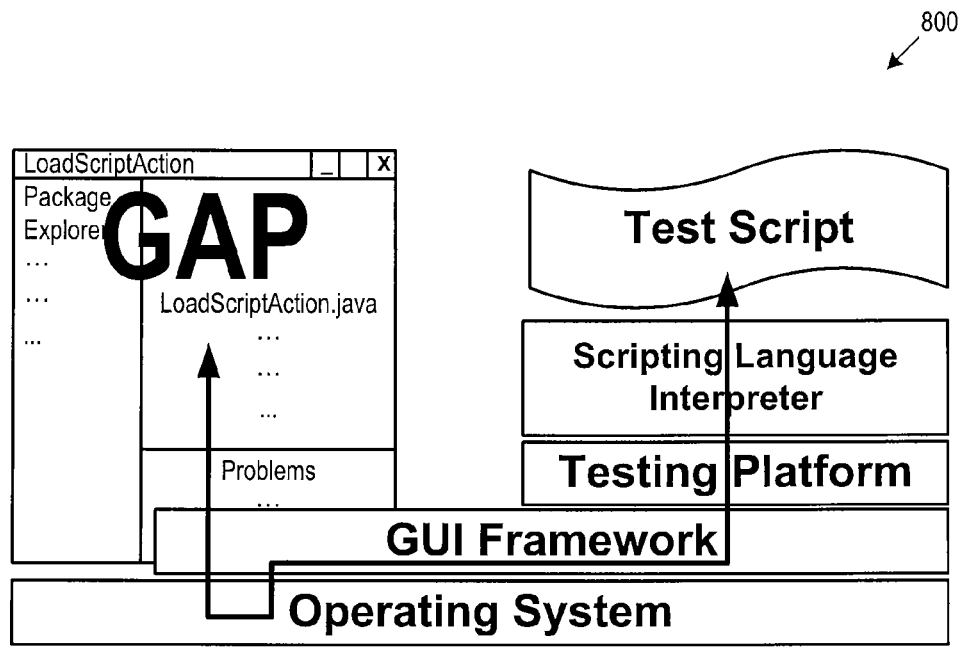
FIG. 8 shows a model of interactions between test scripts and GAPs.

A test automation model 800 that illustrates interactions between test scripts and GAPs is shown in FIG. 8. Statements of test scripts are processed by the scripting language interpreter that is supplied with a testing platform. When the interpreter encounters statements that access and manipulate GUI objects, it passes the control to the testing platform that translates these statements into a series of instructions that are executed by the underlying GUI framework and the operating system.

At an abstract level the system can view the layers between test scripts and GAPs as a reflective connector. A connector is a channel that transmits and executes operations between test scripts and GAPs. Reflection exposes the type of a given GUI object, and it enables test scripts to invoke methods of objects whose classes were not statically known before the GAP is run. This model combines a connector between scripts and GAPs with reflection so that test scripts can access and manipulate GUI objects at run-time.

Each statement in test scripts, which accesses and manipulates GUI objects includes the following operations: (1) navigate to some destination GUI object and (2) invoke methods to perform actions on this object, including getting and setting values. Using implementations of the concepts of reflection and connector, statements in test scripts can navigate GUI objects in GAPs and perform operations on these objects. This is the essence of the current implementations of test automation tools.

Several fundamental problems make it difficult to maintain and evolve test scripts. First, specifications for GUI objects are often not available, and these objects are created dynamically in the GAPs' processes and the contexts of the underlying GUI frameworks (e.g., Windows™ or Java™ SWT). With black-box testing, obtaining information about GUI objects from the source code of GAPs is not an option. Therefore, test engineers have to use capture/replay tools to extract values of properties of GUI objects, so that these objects can be later identified on GUI screens by matching these prerecorded values with the properties of GUI objects that are created at runtime. Because complete specifications of GUI objects are not available, it is difficult to analyze statically how GUI objects are accessed and manipulated by test script statements.

Another problem is that test scripts are run on testing platforms externally to GAPs, and therefore cannot access GUI objects as programming objects that exist within the same programs. Using Application Programming Interface (API) calls exported by testing platforms is a primary mode of accessing and manipulating GUI objects, and these API calls lead to various run-time errors in test scripts especially when their corresponding GAPs are modified.

Consider a test script statement that is written using VBScript of QTP VbWindow("Login").VbButton("Dolt") .Click. The API calls VbWindow and VbButton are exported by the QTP testing framework. Executing these API calls identifies a window whose property values match those stored in some OR under the name "Login," and this window contains a button whose property values match those stored in an OR under the name "Dolt". By calling the method Click, this button is pressed. Since API calls take names of the property values of GUI objects as string variables, and GUI objects are identified only at runtime, it is impossible to apply effective sound checking algorithms. These problems exacerbate the process of detecting and understanding failures in test scripts, making maintenance and evolution of these scripts expensive and prohibitive. These fundamental problems are inherent for most existing open-source and commercial automated testing tools.

FIG. 1 shows a graphical user interface (GUI) tool analysis system 100 ("system 100"). A processor 102 is coupled to a memory 104. The memory 104 includes statistical analysis parameters 106, statistical analysis program 108, and selected statistical measure of performance 110. The processor is operable to execute the statistical analysis program 108. The statistical analysis parameters 106 may include a primary null hypothesis 112 indicating a proposition that no difference exists in a selected statistical measure of performance between testers who manually attempt to locate failures in test scripts for GUI applications and testers who use automated tools to locate failures in the test scripts. The statistical analysis parameters 106 may also include an alternative null hypothesis 114 indicating a proposition that a statistically significant difference in the selected statistical measure of performance exists between testers who manually attempt to locate failures in the test scripts for GUI applications and the testers who use the automated tools to locate failures in the test scripts. The statistical analysis program 108 includes instructions 116 that when executed evaluates the primary null hypothesis 112 and the alternative null hypothesis 114.

The selected statistical measure of performance 110 may include correctly identified failures (CIFs) 118, false positives (FPs) 120, and missed failures (MFs) 122. The statistical analysis parameters 106 may also include a pre-specified level of significance 124 and the statistical analysis program 108 may be implemented to include instructions that when executed evaluates the primary null hypothesis 112 and the alternative null hypotheses 114 at the pre-specified level of significance 124. In addition, the instructions 116 of the statistical analysis program 108 may further include variance analysis 126 and t-test analysis 128.

The memory 104 may further include a statistical analysis result 134, an optimization program 140, statistical variables 142, and statistical constraint equations 148. The statistical analysis result 134 may store the results generated by the statistical analysis program 108. The statistical variables 142 may be identified by an external entity, such as a program testing manager or may be preconfigured in the system 100, and may be further divided into input variables 144 and output variables 146. The statistical constraint equations 148 may include one or more of the statistical variables 142 and may define mathematical relationships among the statistical variables. The statistical constraint equations 148 may be determined by the system 100 based on the statistical analysis result 134, may be preconfigured in the system 100, or may be identified by an external entity, such as the manager. The manager may, for example, identify the statistical constraint equations 148 based on the statistical analysis result 134.

The optimization program 140 may further include an optimization algorithm 150 and the evaluation function 152. The optimization program 140 may be implemented as instructions which cause the processor 102 to receive values of the input variables 144, and determine an optimized value of the statistical variables based on the statistical constraint equations 148 and the values for the input variables 144 by executing the optimization algorithm 150 and the evaluation function 152.

The memory 104 may also include a recommendation 154, representing a recommendation the system 100 may generate based on the results of the optimization program 140. The recommendation 154 may indicate whether manual testing or automated testing is recommended for testing the GUI, as one example. The recommendation 154 may also indicate whether manual maintenance or tool-based maintenance is recommended, in case an automated testing is recommended. Further, if tool-based maintenance is recommended, the recommendation 154 may indicate whether purchasing or leasing the tools for the tool-based maintenance is recommended.

The system 100 may further include a display 130 coupled to the processor 102 and memory 104. The display 130 may be, for example, a computer monitor, a portable device, or another local or remote display. The statistical analysis program 108 may generate a user interface 132 on the display 130. The user interface 132 may display statistical analysis results 134, such as the reports and graphs. The manager may reference the statistical analysis results 134 in identifying the statistical constraint equations 148. The user interface 132 may also display the recommendations 154.

Case Study Design

Figure 2:
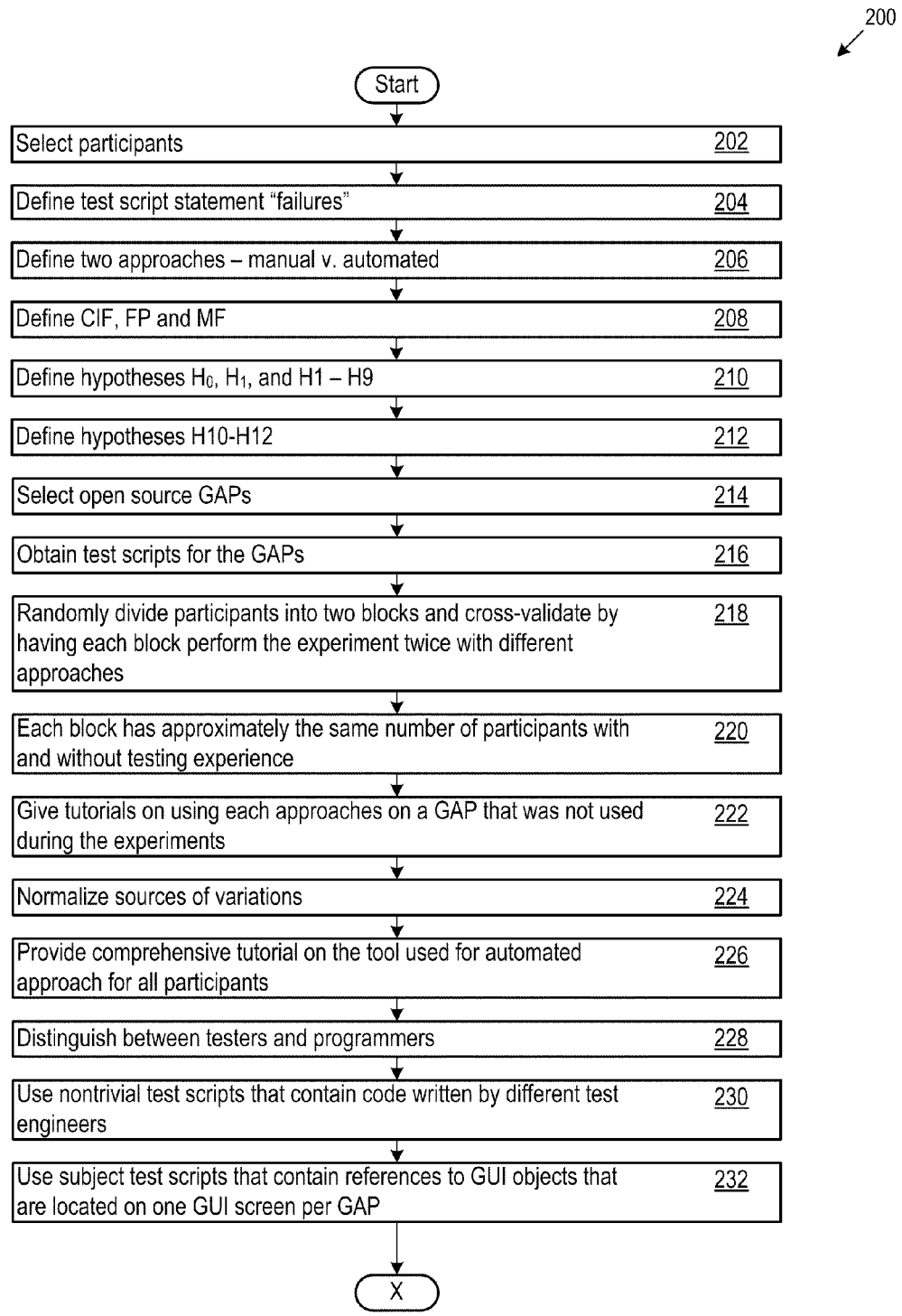
FIG. 2 is a first part of a flow diagram of the logic that a statistical analysis program in a GUI testing analysis system may execute.

FIG. 2 shows a first part of the logic 200 the statistical analysis program 108 may implement. The system 100 determines how effective the tool-based approach is versus the manual approach. In one implementation, the system analyzes a case study with, for example, 45 participants (202). The system may consider test script statements that access and manipulate GUI objects as failures if these statements are broken because of modifications made to the referenced GUI objects in the successive releases of GAPs (204). The system evaluates how well the participants can find failures in test scripts (when running against the new version of the GAP) using two different approaches: manual and automated (e.g., using Quick Test Pro (QTP)) (206). Specifically, the system determines that within a given time frame, with which approach users can report more correctly identified failures (CIFs) in test scripts that result from changed GUI objects between successive releases of the subject GAPs, and with which approach users report fewer false positives (FPs), i.e., correct statements in test scripts that participants report as failures by mistake. The system may also analyze how many failures participant miss, i.e., missed failures (MFs) (208). The system provides insight into how two different groups of users (GUI developers and testers) perform using the tool-based automatic and the manual approaches.

Hypotheses

The system considers the following null and alternative hypotheses to evaluate how close the means are for the CIFs, FPs, and MFs for control and treatment groups (210). Unless specified otherwise, participants of the treatment group uses the automated tool, and participants of the control group use the manual approach. The system may seek to evaluate the following hypotheses at a 0.05 level of significance (or any other significance level specified as a parameter by the system operator).

$H_0$ The primary null hypothesis is that there is no difference in the numbers of CIFs, FPs, and MFs between participants who attempt to locate failures in test scripts manually or using QTP.

$H_1$ An alternative hypothesis to $H_0$ is that there is statistically significant difference in the numbers of CIFs, FPs, and MFs between participants who attempt to locate failures in test scripts manually or using QTP.

Once the system tests the null hypothesis $H_0$, the system may determine or analyze the directionality of means, $\mu$, of the results of control and treatment groups. The system may compare the effectiveness of the tool QTP versus the baseline manual approach with respect to CIFs, MFs, and FPs.

H1 (CIFs for all participants) The effective null hypothesis is that $\mu_{cif}^{QTP} = \mu_{cif}^{Manual}$, while the true null hypothesis is that $\mu_{cif}^{QTP} \geq \mu_{cif}^{Manual}$. Conversely, the alternative hypothesis is that $\mu_{cif}^{QTP} < \mu_{cif}^{Manual}$.

H2 (FPs for all participants) The effective null hypothesis is that $\mu_{fp}^{QTP} = \mu_{fp}^{Manual}$, while the true null hypothesis is that $\mu_{fp}^{QTP} \leq \mu_{cif}^{Manual}$. Conversely, the alternative hypothesis is that $\mu_{fp}^{QTP} > \mu_{fp}^{Manual}$.

H3 (MFs for all participants) The effective null hypothesis is that $\mu_{mf}^{QTP} = \mu_{mf}^{Manual}$, while the true null hypothesis is that $\mu_{mf}^{QTP} \leq \mu_{mf}^{Manual}$. Conversely, the alternative hypothesis is that $\mu_{mf}^{QTP} = \mu_{mf}^{Manual}$.

H4 (CIFs for testers) The effective null hypothesis is that $\mu_{cif}^{QTP}=\mu_{cif}^{Manual}$, while the true null hypothesis is that $\mu_{cif}^{QTP} \geq \mu_{cif}^{Manual}$. Conversely, the alternative hypothesis is that $\mu_{cif}^{QTP}<\mu_{cif}^{Manual}$.

H5 (FPs for testers) The effective null hypothesis is that $\mu_{fp}^{QTP}=\mu_{fp}^{Manual}$, while the true null hypothesis is that $\mu_{fp}^{QTP} \leq \mu_{fp}^{Manual}$. Conversely, the alternative hypothesis is that $\mu_{fp}^{QTP}>\mu_{fp}^{Manual}$.

H6 (MFs for testers) The effective null hypothesis is that $\mu_{mf}^{QTP}=\mu_{mf}^{Manual}$, while the true null hypothesis is that $\mu_{mf}^{QTP} \leq \mu_{mf}^{Manual}$. Conversely, the alternative hypothesis is that $\mu_{mf}^{QTP}>\mu_{mf}^{Manual}$.

H7 (CIFs for non-testers) The effective hypothesis is that $\mu_{cif}^{QTP}=\mu_{cif}^{Manual}$, while the true null hypothesis is that $\mu_{cif}^{QTP} \geq \mu_{cif}^{Manual}$. Conversely, the alternative hypothesis is that $\mu_{cif}^{QTP}<\mu_{cif}^{Manual}$.

H8 (FPs for non-testers)

$\mu_{fp}^{QTP}=\mu_{fp}^{Manual}$, while the true null hypothesis is that $\mu_{fp}^{QTP} \leq \mu_{fp}^{Manual}$. Conversely, the alternative hypothesis is that $\mu_{fp}^{QTP}>\mu_{fp}^{Manual}$.

H9 (MFs for non-testers) The effective hypothesis is that $\mu_{mf}^{QTP}=\mu_{mf}^{Manual}$, while the true null hypothesis is that $\mu_{mf}^{QTP}=\mu_{mf}^{Manual}$. Conversely, the alternative hypothesis is that $\mu_{mf}^{QTP}=\mu_{mf}^{Manual}$.

In addition, the system may determine whether the performance of the participants who have testing experience differs from those who do not have any testing experience (212). The categorical variables are testing experience and reported CIFs, FPs, and MFs. Hypothesis H10 considers correlation between the hypotheses H4 and H7, hypothesis H11 considers correlation between the hypotheses H5 and H8, and the hypothesis H12 considers correlation between the hypotheses H6 and H9.

H10 (Independence of testing experience from CIFs) the testing categorical variable is independent from the variable CIF; the alternative is that they are associated.

H11 (Independence of testing experience from FPs) the testing categorical variable is independent from the variable FP; the alternative is that they are associated.

H12 (Independence of testing experience from MFs) the testing categorical variable is independent from the variable MFs; the alternative is that they are associated.

Subject GAPs and Test Scripts

In one implementation, the system analyzed the results of testing against the following four open source subject GAPs based on the following criteria: easy-to-understand domain, limited size of GUI (less than 200 GUI objects), and two successive releases of GAPs with modified GUI objects (214). Twister™ (versions 2.0 and 3.0.5) is a real-time stock quote downloading programming environment that allows users to write programs that download stock quotes. mRemote™ (versions 1.0 and 1.35) enables users to manage remote connections in a single place by supporting various protocols (e.g., SSH, Telnet, and HTTP/S). University Directory™ (versions 1.0 and 1.1) allows users to obtain data on different universities. Finally, Budget Tracker™ (versions 1.06 and 2.1) is a program for tracking budget categories, budget planning for each month and keeping track of expenses. Most of these applications are nontrivial, they are highly ranked in Sourceforge™ with the activity over 95%.

TABLE 1

| Subject Program | Size | | | | | |
| --- | --- | --- | --- | --- | --- | --- |
| | Script LOC | Ref'd GUI, objs. | Added GUI objs. | Deleted GUI objs. | APIs, No. of calls | Total Failures |
| Twister | 492 | 54 | 81 | 12 | 42 | 16 |
| mRemote | 538 | 17 | 42 | 20 | 28 | 17 |
| University Directory | 920 | 36 | 35 | 9 | 29 | 13 |
| Budget Tracker | 343 | 8 | 18 | 5 | 17 | 14 |

In performing the tests, test scripts were obtained for each of the GAPs that contained both GUI and non-GUI related code (e.g., setting values of environment variables and reading and manipulating directories contents) (216). The scripts were also modified to include generated statements that referenced GUI objects in the subject GAPs. The scripts were also interspersed with the generated statements, replicated throughout the test scripts. Information on subject GAPs and test scripts can be found in Table 1.

Table 1 shows the subject GAPs and test scripts. Column Size contains five subcolumns reporting the numbers of lines of code (LOC) in test scripts, the number of GUI objects that are referenced in the script, numbers of added and deleted GUI objects, and the numbers of API calls that reference GUI objects. The column Total Failures show the number of failures that are injected in test scripts.

Methodology

The system analyzes a cross validation study design in a cohort of 45 participants who were randomly divided into two blocks labeled using different color labels. The system sectioned the study into two experiments in which each block was given a different approach (manual and automated) to apply to the subject GAPs (218). Thus each participant used each approach on different GAPs in the process of the case study. The system randomly distributed participants so that each block had approximately the same number of participants with and without testing experience (220). Before the study the participants were given two one-hour tutorials on using each of these approaches. The example GAP (mRemote) in these tutorials was not used during the experiments thereby eliminating the knowledge of the GAP as a possible confounding factor (222).

The participants have different backgrounds, experience, and belong to different groups within a large consulting organization. Out of 45 participants, 23 had prior testing experience ranging from three weeks to ten years, and 18 participants reported prior experience with writing programs in scripting languages, including test scripts. Seven participants reported prior experience with the automated tool, six participants reported prior experience with other GUI testing tools. Twenty nine participants have bachelor degrees and ten have master degrees in different technical disciplines.

Normalizing Sources of Variations

Sources of variation are all things that could cause an observation to have a different value from another observation. In designing the experiment, the sources of variations are identified, including the prior experience of the participants with tools, GAPs, and test scripts used in this study, the amount of time they spend on learning how to use tools, and different computing environments which they use during the case study. The latter is extremely sensitive since some participants who use slow laptops with limited form-factor are likely to be less effective than other participants who use much better computing systems.

The system controls the experiment design to drastically reduce the effects of covariates (e.g., nuisance factors) in order to normalize sources of variations. Using the cross-validation design the experiment normalized variations to a certain degree since each participant uses all three approaches on different subject GAPs (224). The system selected participants who had no prior knowledge of the subject GAPs. At the same time, subject GAPs belong to domains that are easy to understand, and these GAPs have similar complexity, so variations between them are negligent. However, different computing environments and prior experience of users with testing scripts and subject GAPs are major covariates.

The study analyzed by the system eliminated the effect of the computing environments by providing all participants with Dell Latitude D630 laptops with Intel Core 2 Duo Processor 2.4 GHz with 4 MB L2 Cache, 1 Gb RAM, and 14.1" WXGA+ displays. The same standard Windows™ XP-based image was installed on the laptops. The installed GAPs, scripts, and tools were installed in a virtual machine that runs on top of the Microsoft™ Virtual PC thereby allowing participants to obtain a common environment of the entire experimental setup.

Tests and the Normality Assumption

The system applied the one-way Analysis of Variance (ANOVA), t-tests for paired two samples for means, and $X^2$ to evaluate the hypotheses. These tests are based on an assumption that the population is normally distributed. The law of large numbers states that if the population sample is sufficiently large (between 30 to 50 participants), then the central limit theorem applies even if the population is not normally distributed. Since the study included 45 participants, the central limit theorem applies, and the above-mentioned tests have statistical significance.

Threats to Validity

Since seven participants reported prior experience with the automated tool, this case study can be viewed as biased towards the automated tool versus the manual approach and Manual. To reduce this bias, the study included a comprehensive tutorial on the automated tool for all participants of the study (226), and given the large number of participants it is expected that this bias is negligent. However, the results of this study show that participants who had prior experience with the automated tool performed better with the manual approach. In addition, prior testing experience of the participants remains a source of variation.

The study distinguished between participants who have testing experience (testers) and those who do not have any testing experience (programmer, as defined in hypotheses as non-tester) based on the data that these participants reported in their resumes and questionnaires (228). This division does not account for large variations in different skills that may affect the results of this case study. Specifically, it is desired to conduct an independent evaluation of the skills of the participants using programming tasks, which was not done.

Other considerations: the study used nontrivial test scripts that contained code written by different test engineers (230); there are no metrics of how representative these scripts are of those used to test GAPs; no data was available to report the percentage of coverage of GUI objects by test scripts; and subject test scripts contain references to GUI objects that are located on one GUI screen per GAP (232). Other case studies may be created by extending the case study to support test scripts whose statements reference objects on different GUI screens.

Results

Benchmark Evaluation

Figure 3:
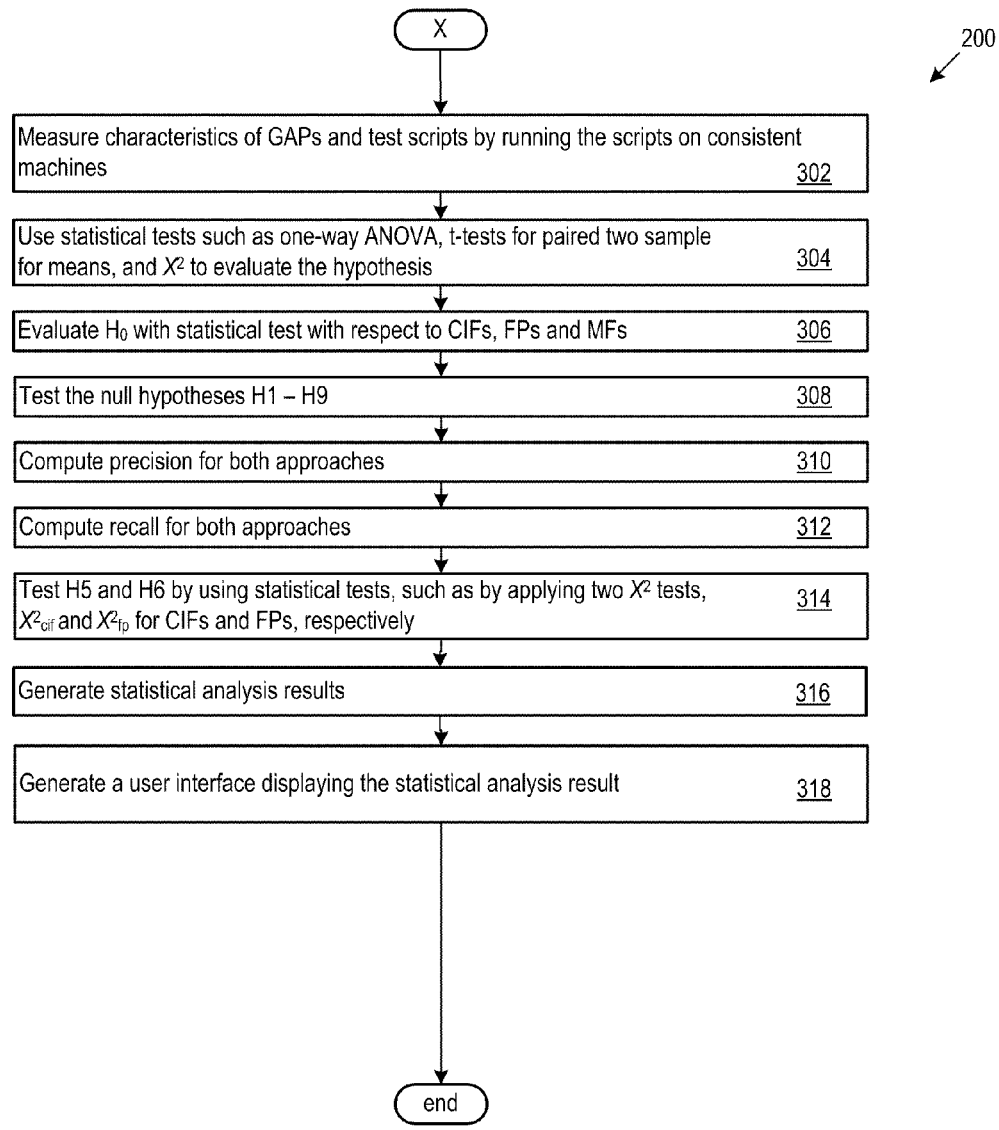
FIG. 3 is a second part of the flow diagram of the logic that a statistical analysis program in the GUI testing analysis system may execute.

FIG. 3 shows a second part of the flow diagram 200 of the logic the statistical analysis program 108 may implement. The system measured the characteristics of GAPs and test scripts by running these scripts using Windows™ XP Pro on a computer with Intel Pentium IV 3.2 GHz CPU and 2 GB of RAM (302). Experimental results of applying the automated tool and scripts to the subject programs and scripts are shown in Table 1 above.

Case Study Results

Below, are reported the results of the case study and detailed evaluation of the null hypotheses by the system. The system applied statistical tests such as one-way ANOVA, t-tests for paired two samples for means, and $X^2$ to evaluate the hypotheses stated above in the Hypotheses section (304). However, the system may apply other statistical tests and hypothesis depending on the implementation.

The system may analyze, as a main independent variable, the approaches (manual or automated) that participants use to find failures in test scripts. The other independent variable that the system may analyze is the participants' testing experience. Dependent variables that the system may analyze are the numbers of correctly identified failures (CIFs), false positives (FPs), and missed failures (MFs). The study minimizes the effects of other variables (GAPs, test scripts, prior knowledge) are minimized by the design of the case study.

Testing the Null Hypothesis

The system applied statistical test such as ANOVA to evaluate the null hypothesis $H_0$ that the variation in an experiment is no greater than that due to normal variation of individuals' characteristics and error in their measurement (306). The results of ANOVA with respect to CIFs confirm that there are large differences between the groups for CIF with F=4: 12>$F_{crit}$=3:97 with p<0:05 which is statistically significant. The mean CIF for the manual approach is 0:84 with the variance 2:6, which is smaller than the mean CIF for the automated approach, 1:84 with the variance 6:6.

Similarly, the results of ANOVA with respect to FPs confirm that there are large differences between the groups for CIF with F=12:1>$F_{crit}$=3:97 with p<0:0009 which is strongly statistically significant. The mean FP for the manual approach is 6:1 with the variance 19:4, which is bigger than the mean FP for the automated approach, 3:1 with the variance 8:7.

Finally, the results of ANOVA with respect to MFs confirm that there are large differences between the groups for MF with F=4:43>Fcrit=3:97 with p<0:04 which is strongly statistically significant. The mean MF for the manual approach is 13:5 with the variance 3:6, which is bigger than the mean MF for the automated approach, 12:4 with the variance 7:1. Based on these results the system rejects the null hypothesis and the system accepts the alternative hypothesis H1.

Figure 4:
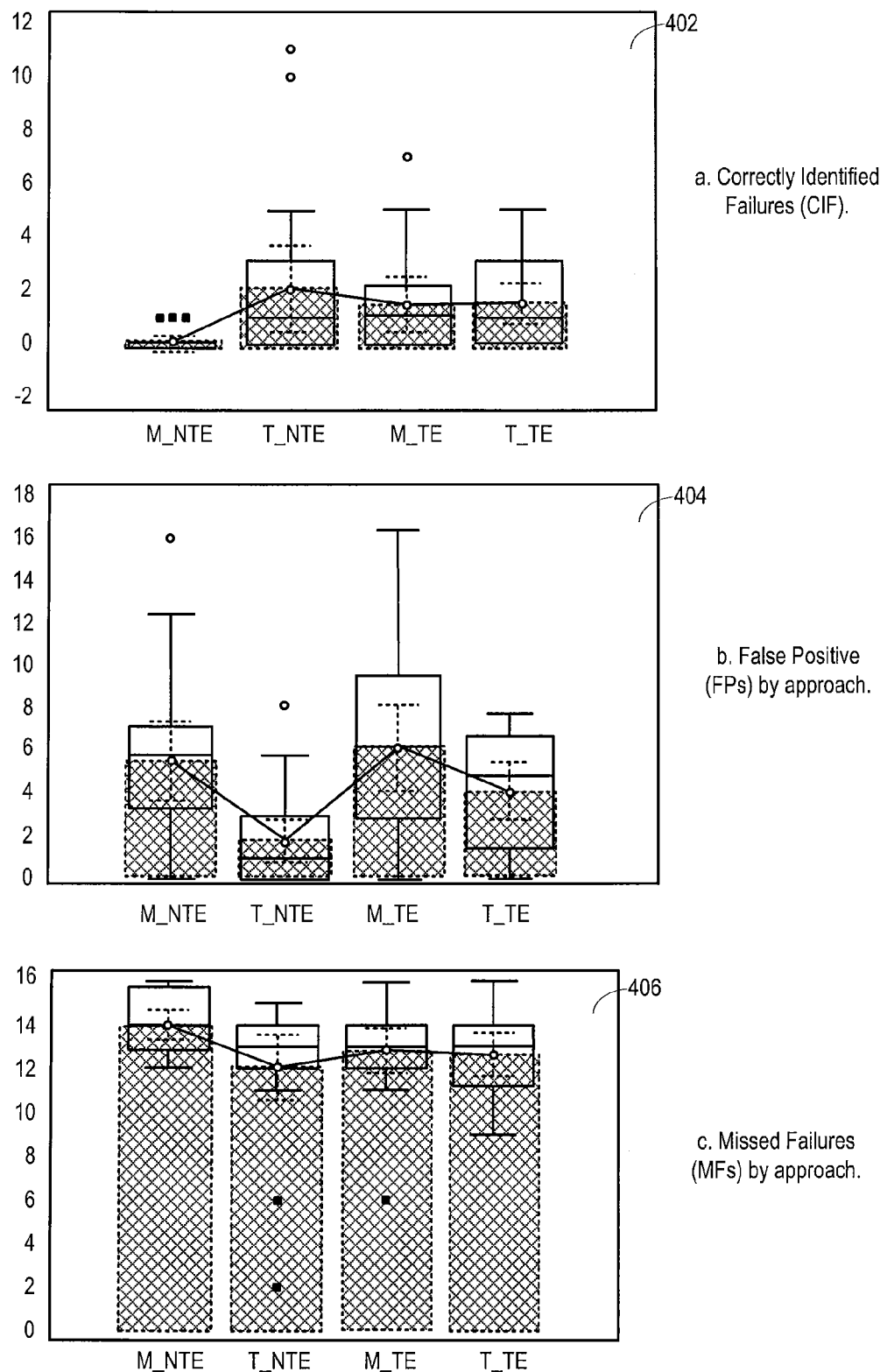
FIG. 4 shows statistical summaries of the results of the case study for Correctly Identified Failures (CIFs), False Positives (FPs) and Missed Failures (MFs) by approach.

FIG. 4 shows a statistical summary of the results of the case study for CIFs, FPs and MFs (median, quartiles, range and extreme values), shown as box-and-whisker plots 402, 404 and 406, correspondingly with 95% confidence interval for the mean. The system may generate the box-and-whisker plots (or any other output) on a display to show the results of the case study to an operator of the system. The central box represents the values from the lower to upper quartile (25 to 75 percentile). The middle line represents the median. The thicker vertical line extends from the minimum to the maximum value, excluding outside and far out values, which are displayed as separate circles and small squares. The filled-out box represents the values from the minimum to the mean, and the thinner vertical line extends from the quarter below the mean to the quarter above the mean. An outside value is defined as a value that is smaller than the lower quartile minus 1:5 times the interquartile range, or larger than the upper quartile plus 1:5 times the interquartile range (inner fences). A far out value is defined as a value that is smaller than the lower quartile minus three times the interquartile range, or larger than the upper quartile plus three times the interquartile range (outer fences). Each bar is marked with the description of the experiment, where M stands for manual approach, T stands for tool-based approach, TE stands for the group with testing experience, and NTE stands for the group with no testing experience.

TABLE 2

| H | Var | Test Experience | Approach | Samples | Min | Max | Median | μ | $\sigma^2$ |
|---|---|---|---|---|---|---|---|---|---|
| H1 | CIF | All | Manual | 38 | 0 | 7 | 0 | 0.84 | 1.62 |
|    |     |     | Automated | 38 | 0 | 0 | 11 | 1.84 | 2.57 |
| H2 | FP | All | Manual | 38 | 0 | 17 | 6 | 6.11 | 4.41 |
|    |     |     | Automated | 38 | 0 | 8 | 2 | 3.11 | 2.95 |
| H3 | MF | All | Manual | 37 | 6 | 16 | 14 | 13.48 | 3.8 |
|    |     |     | Automated | 37 | 2 | 16 | 13 | 12.35 | 2.7 |
| H4 | CIF | Testers | Manual | 19 | 0 | 7 | 1 | 1.53 | 2.06 |
|    |     |     | Automated | 19 | 0 | 5 | 1 | 1.58 | 1.54 |
| H5 | FP | Testers | Manual | 20 | 0 | 17 | 6.5 | 6.4 | 4.6 |
|    |     |     | Automated | 18 | 0 | 8 | 5 | 4.25 | 3.04 |
| H6 | MF | Testers | Manual | 19 | 6 | 16 | 13 | 12.9 | 2.86 |
|    |     |     | Automated | 19 | 9 | 16 | 13 | 12.69 | 2.13 |
| H7 | CIF | Programmers | Manual | 19 | 0 | 1 | 0 | 0.16 | 0.37 |
|    |     |     | Automated | 19 | 0 | 11 | 1 | 2.1 | 3.33 |
| H8 | FP | Programmers | Manual | 18 | 0 | 16 | 6 | 5.78 | 4.3 |
|    |     |     | Automated | 18 | 0 | 8 | 1 | 1.83 | 2.33 |
| H9 | MF | Programmers | Manual | 18 | 12 | 16 | 14 | 14.1 | 1.41 |
|    |     |     | Automated | 18 | 2 | 15 | 13 | 12 | 3.16 |

| H | Var | Test Experience | DF | C | p | T | $T_{crit}$ |
|---|---|---|---|---|---|---|---|
| H1 | CIF | All | 37 | 0.02 | 0.03 | 2.0 | 2.03 |
| H2 | FP | All | 37 | 0.25 | 0.00003 | 3.96 | 2.02 |
| H3 | MF | All | 36 | 0.13 | 0.03 | 1.98 | 2.1 |
| H4 | CIF | Testers | 18 | 0.14 | 0.05 | 0.1 | 2.1 |
| H5 | FP | Testers | 19 | 0.3 | 0.03 | 2.05 | 2.1 |
| H6 | MF | Testers | 18 | 0.1 | 0.38 | 0.3 | 2.1 |
| H7 | CIF | Programmers | 18 | 0.24 | 0.01 | 2.46 | 2.1 |
| H8 | FP | Programmers | 17 | 0.14 | 0.001 | 3.64 | 2.1 |
| H9 | MF | Programmers | 17 | 0.33 | 0.02 | 2.3 | 2.1 |

Comparing Automated with Manual

To test the null hypotheses H1 to H9, the system applies two t-tests for paired two samples for means, for CIFs, FPs, and MFs for participants who used the automated approach (308) and the manual approach. The results of this test for CIFs and for FPs are shown in Table 2. Results of t-tests of hypotheses, H, for paired two sample for means for two-tail distribution, for dependent variables specified in the columns Var (either CIF, FP, and MF) and Test Experience (either all participants, testers, or programmers=all minus testers) whose measurements are reported in the following columns. Extremal values, Median, Means, μ, variance, s2, degrees of freedom, DF, and the pearson correlation coefficient, C, are reported along with the results of the evaluation of the hypotheses, i.e., statistical significance, p, and the T statistics. The column Samples shows that 37 to 41 out of a total of 45 participants participated in all experiments (several participants missed one or two experiments). Based on these results the system rejects the null hypotheses H2, H7, H8, and H9, and the system accepts the alternative hypotheses that say that participants without testing experience (programmers) who use the automated approach report fewer false positives, correctly identify more failures, and miss fewer failures in test scripts than those who use the manual approach.

Alternatively, the system accepts null hypotheses H1, H3, H4, H5, and H6 and reject the corresponding alternative hypotheses that say that participants with testing experience (testers) who use the automated approach report approximately the same numbers of false positives and correctly identify the same number of failures in test scripts than those who use the manual approach.

One explanation of this result uses the key differentiator between testers and programmers—testing experience. Programmers who do not have testing experience and whose goal is to write code rather than test it, rely on testing tools more than testers who understand test scripts and know how to fix them. Testers know the limitations of testing tools, and they can work without them as effectively as when using these tools.

Based on the results of the case study and considering the high cost of the programmers' time and the lower cost of the time of test engineers, and considering that programmers often modify GAP objects in the process of developing software the system recommendation is to supply programmers with testing tools that enable them to fix test scripts faster so that these scripts can unit test software. The other side of the system recommendation is that experienced test engineers are likely to be as productive with the manual approach as with the tool-based approach when fixing test scripts, and the system may consequently recommend that organizations do not need to provide each tester with an expensive tool license to fix test scripts.

Precision and Recall

The system measures the qualities of both approaches using two ratios: precision and recall (310 and 312). The precision ratio is computed as CIF/(CIF+FP), and the recall ration is computed as CIF/TF, where TF is the total number of failures in test scripts. The precision is the ratio of correctly recovered failures, and the recall ratio shows how mistaken participants are when analyzing failures in test scripts.

Figure 5:
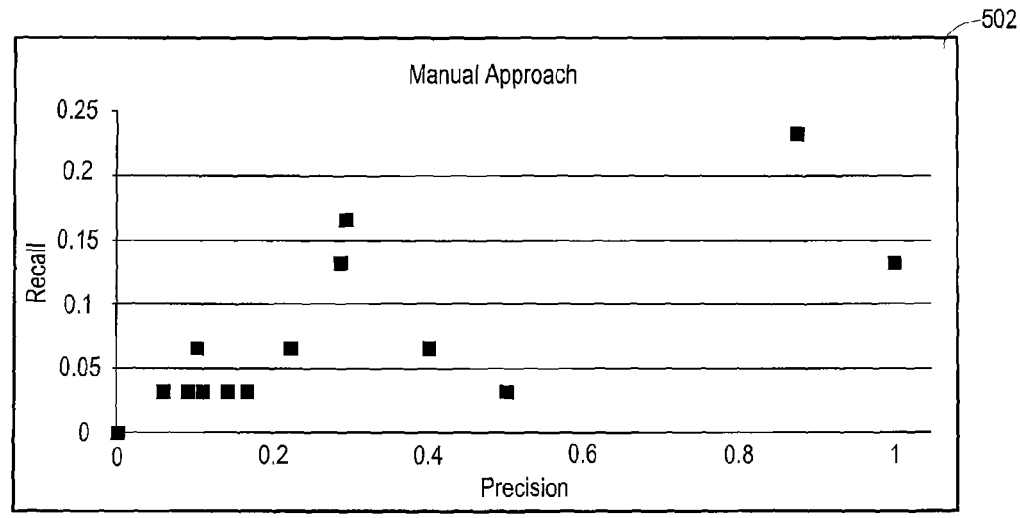
FIG. 5 shows graphs for precision and recall for the manual approach and the automatic approach for the case study described below.
Figure 5:
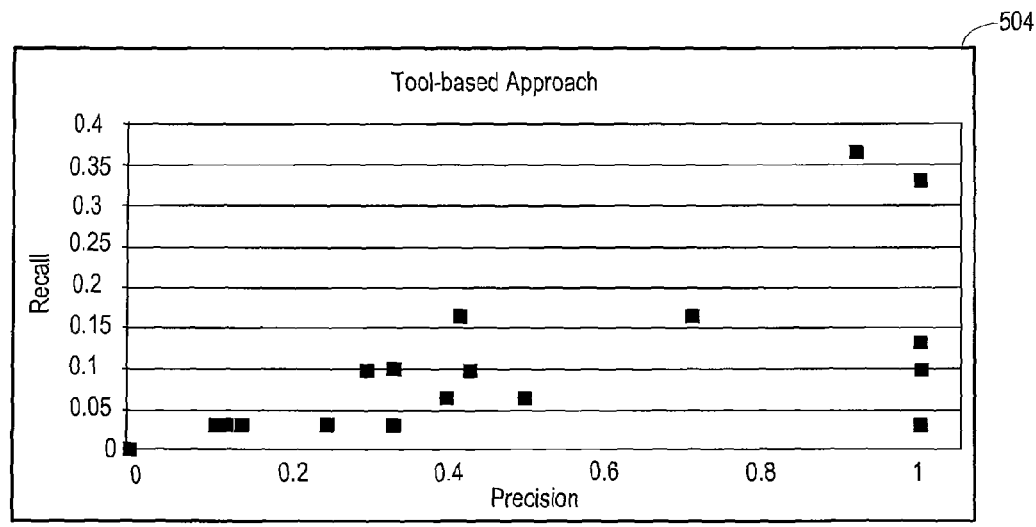
Figure 6:
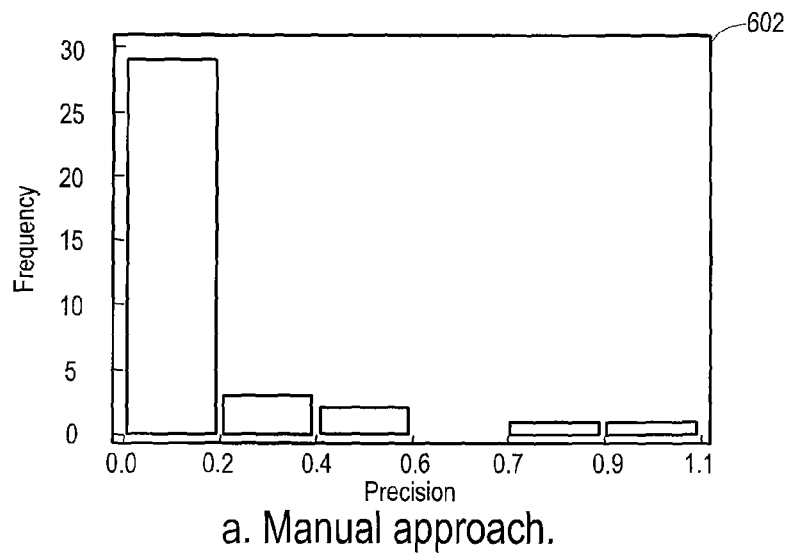
FIG. 6 shows histograms showing precision distribution values for the manual approach and the automatic approach.
Figure 6:
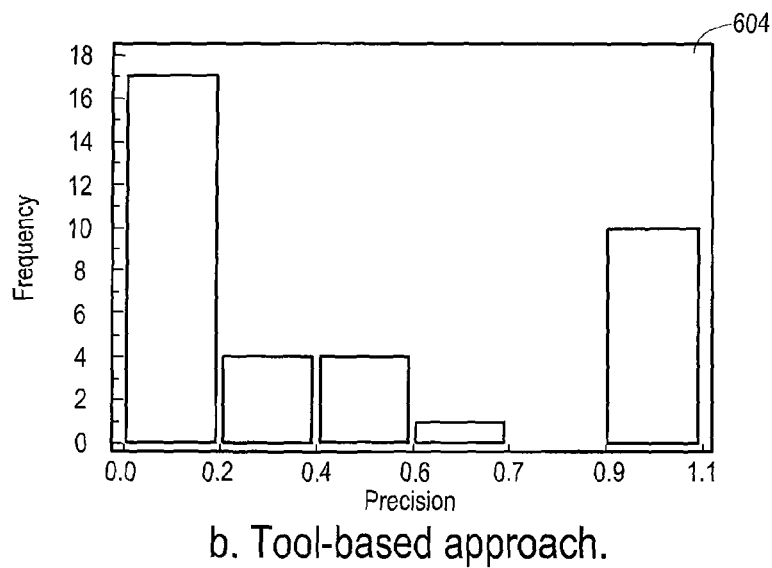
Figure 7:
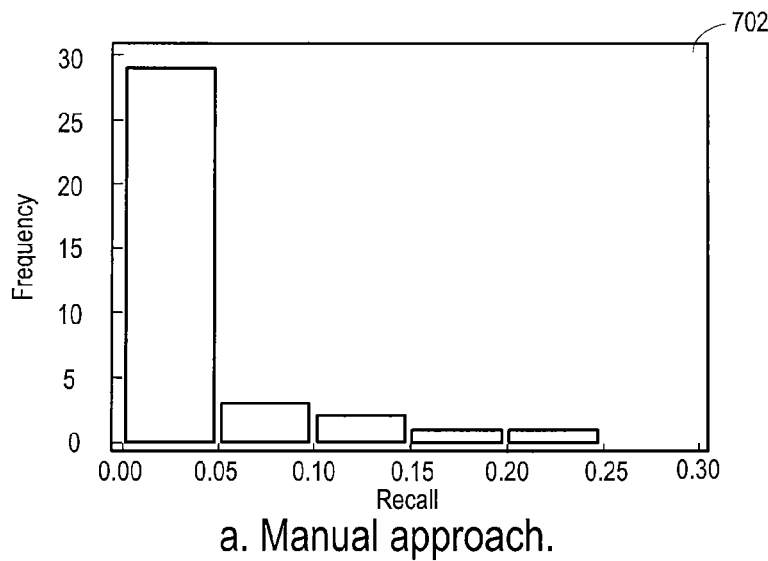
FIG. 7 shows histograms showing recall distribution values for the manual approach and the automatic approach.
Figure 7:
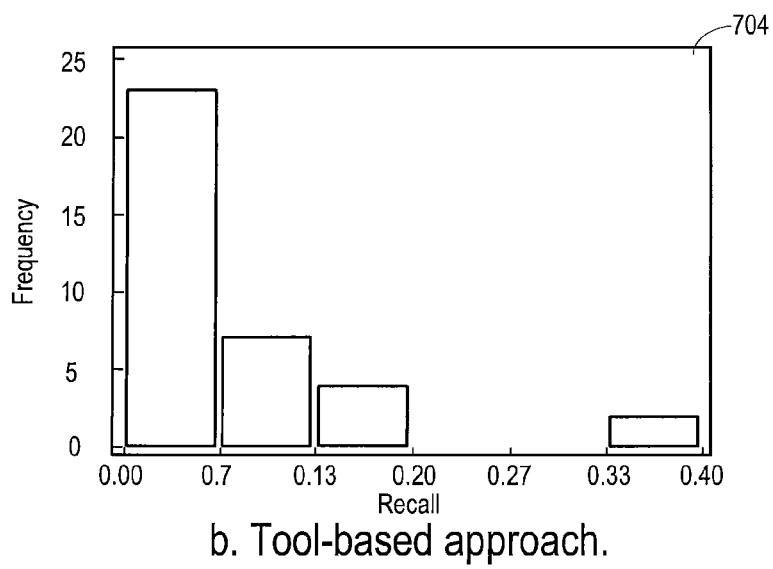

One benefit of computing the precision and recall is to evaluate the difference between CIFs and FPs. If all identified failures are in fact real failures and not FPs, i.e., FP=0, then precision=1. If all identified failures are FP, i.e., CIF=0, then precision=0 and recall=0. The system may generate graphs for precision and recall for the manual approach and automated approach, such as graphs 502 and 504 shown in FIG. 5, correspondingly. The system may also generate and display histograms of precision and recall values for these approaches, such as shown FIG. 6 (histogram 602, manual; histogram 604, automatic) and FIG. 7 (histogram 702, manual; histogram 704, automatic) correspondingly. From these graphs one can see that precision and recall is somewhat better with automated approach than with the manual approach.

Testing Relationships

The system may construct a contingency table to establish a relationship between CIFs and FPs for participants with and without testing experience as shown in Table 3. To test the null hypotheses H5 and H6 that the categorical variables CIFs and FPs are independent from the categorical variable testing experience, the system may perform statistical tests, such as applying two $X^2$-tests, $X^2_{cif}$ and $X^2_{fp}$ for CIFs and FPs respectively (314). The system obtains $X^2_{cif}$=21:3 for p<0:0001 and $X^2_{fp}$=11:5 for p<0:0031. The high values of $X^2$ allow the system to reject H10, H11, and H12 in favor of the alternative hypotheses suggesting that there is statistically strong relationship between testing experiences of participants and the numbers of reported CIFs and FPs. T-tests reveal that the automated approach made a positive difference for inexperienced participants, while those with testing experience still performed better with the manual approach than with the automated approach.

TABLE 3

| Test | CIFs | | | FPs | | | MFs | | | Ratio | Ratio |
|---|---|---|---|---|---|---|---|---|---|---|---|
| Exp | Man | Auto | Total | Man | Auto | Total | Man | Auto | Total | CIFs/FPs | CIFs/MFs |
| Yes | 29 | 30 | 59 | 128 | 85 | 213 | 245 | 241 | 486 | 0.28 | 0.12 |
| No | 3 | 40 | 43 | 104 | 33 | 137 | 254 | 216 | 470 | 0.31 | 0.09 |
| Total | 32 | 70 | 102 | 232 | 118 | 350 | 499 | 457 | 956 | 0.29 | 0.11 |

The system 100 may generate the statistical analysis results 134 based on the analysis of the statistical analysis program 108 (316), and generate the user interface 132 on the display device 130 to display the statistical analysis results (318). The statistical analysis results 134 may include some or all of the information shown above in Tables 1-3 and in FIGS. 4-7.

Generating Recommendations

The system 100 may include statistical variables 142 stored in the memory 104. The statistical variables 142 may be categorized into input variables 144 and output variables 146. The system 100 may also include the statistical constraint equations 148 stored in the memory 104. The statistical constraint equations 148 may be preconfigured in the memory 104, defined by the manager based on the statistical analysis result 134, or obtained in other ways. The statistical constraint equations 148 may include one or more of the statistical variables 142, and constrain the mathematical relationships among the included statistical variables 142. The statistical variables 142 may include, but is not limited to, the variables shown in Table 4.

TABLE 4

| | Description |
|---|---|
| Input Variables 144 | |
| MTR | Manual tester rate |
| MTT | Manual testing time |
| ER | Expected revisions |
| NMT | Number of manual tester needed |
| ETER | Experienced test engineer rate |
| NTER | Novice test engineer rate |
| TLC | Test tool license cost |
| TPC | Test tool purchasing cost |
| Output Variables 146 | |
| TSCT | Test scripts composition time |
| TSRT | Test scripts running time |
| TSMT | Test scripts maintenance time (manual) |
| MS | Tool based maintenance speedup |
| NTL | Number of test tool license needed |
| NTEN | Number of test engineers needed |
| TP | Test plan (manual or automated) |
| MP | Maintenance plan (tool based or not) |
| TUP | Tool usage plan (purchase or lease) |
| TC | Total cost |

The values for the input variables 144 may be work place-dependent and may be received from a manager of a work place, preconfigured in the memory 104 (e.g., based on prior experience), or obtained in other ways. MTR represents the cost for hiring a manual tester. The cost for hiring the manual tester may include, for example, the hourly rate paid to the manual tester. MTR may be represented as units of monetary value over time, such as dollars ($)/hour. MTT represents the time required for a manual tester to conduct a manual GUI testing. MTT may be represented as units of time, such as hours. ER represents the number of revisions a tester goes through in writing a GUI testing script for automated testing. ER may be represented as a number of revisions. NMT represents the number of manual testers needed for conducting a manual GUI testing. NMT may be represented as number of persons. ETER represents the cost for hiring an experienced test engineer. The cost for hiring the experienced test engineer may include, for example, the hourly rate paid to the experienced test engineer. ETER may be represented as monetary value over time, such as dollars ($)/hour. NTER represents the cost for hiring a novice test engineer. The cost for hiring the novice test engineer may include, for example, the hourly rate paid to the novice test engineer. NTER may be represented as units of monetary value over time, such as dollars ($)/hour. TLC represents the cost for licensing a test tool for an automated GUI testing. TLC may be represented as units of monetary value, such as dollars ($) or other units of currency. TPC represents the cost for purchasing a test tool for an automated GUI testing. TPC may be represented as units of monetary value, such as dollars ($) or other units of currency.

The output variables 146 may be dependent on the values received for the input variables 144 and the statistical constraint equations 148. Given values of the input variables 144, the system 100 may determine the output variables 146 in the manner noted below. TSCT represents the time it takes to compose the test scripts for an automated GUI testing. TSCT may be represented in units of time, such as hours. TSRT represents the time it takes to run the test scripts for an automated GUI testing. TSRT may be represented in units of time, such as hours. TSMT represents the time it takes to maintain the test scripts for an automated GUI testing. TSMT may be represented in units of time, such as hours. MS represents the factor by which a tool based maintenance quicker than a manual maintenance of GUI testing tools. MS may be represented as a real number, without any units. NTL represents the number of test tool licenses needed to run an automated GUI testing. NTL may be represented in units of number of licenses. NTEN represents the number of test engineers needed to run an automated GUI testing. NTEN may be represented in units of number of test engineers. TP represents whether a manual or an automated testing is used. A value of "0" may represent manual, and a value of "1" may represent automated. MP represents whether a manual or a tool based test script maintenance is used, in the event an automated testing is used. A value of "0" may represent manual maintenance, and a value of "1" may represent tool based maintenance. TUP represents whether a maintenance tool is purchased or leased, in the event an automated testing used for GUI testing, and tool based maintenance is used for test script maintenance. A value of "0" may represent purchasing the tool, and a value of "1" may represent leasing the tool. TC represents the total cost for conducting a GUI test. TC may be represented in monetary units, such as dollars ($).

Based on the statistical variables 144 and the statistical constraint equations 148, the system 100 may generate a recommendation 154 by executing the optimization program 140. The recommendation 154 generated by the system 100 may be largely related to one of the following three approaches: a) manual testing of the GUI, b) automated testing of the GUI with manual test script maintenance, and c) automated testing of the GUI with tool based test script maintenance. For each of these types of approaches, the system 100 may consider various factors related to each approach in generating the recommendation 154. For manual testing a), the system 100 may consider the rate at which the manual testers may conduct the testing, and the time it takes for the manual testers to conduct the test. For automated approaches b) and c), the system may consider factors related to composing the test scripts (number of test engineers needed, number of licenses required for the test tools and associated costs), running the test scripts (test script running time), and factors associated with maintaining the test scripts (test engineer pay rate and manual maintenance time for approach b); test engineer pay rate, additional tool license number and cost, and tool speed up factor for approach c)).

The statistical variables 142 may include variables which represent the factors discussed above which the system 100 may consider in generating the recommendations. Each of the approaches that the recommendation 154 may possibly make may be represented as a combination of values of some or all of the output variables 146. For example, the recommendation 154 may be represented by the combination of values of output variables TP and MP. The variables TP and MP may each hold either a value of "0" or a value of "1". For TP, a "0" may represent a manual test plan and a "1" may represent an automatic test plan. For MP, a "0" may represent a manual maintenance, and a "1" may represent a tool-based maintenance. If the recommendation 154 generated by the system 100 represents the approach b), the recommendation 154 may be, for example, a value "1" for TP, representing automatic test plan and an MP with the value "0" representing manual maintenance.

Figure 9:
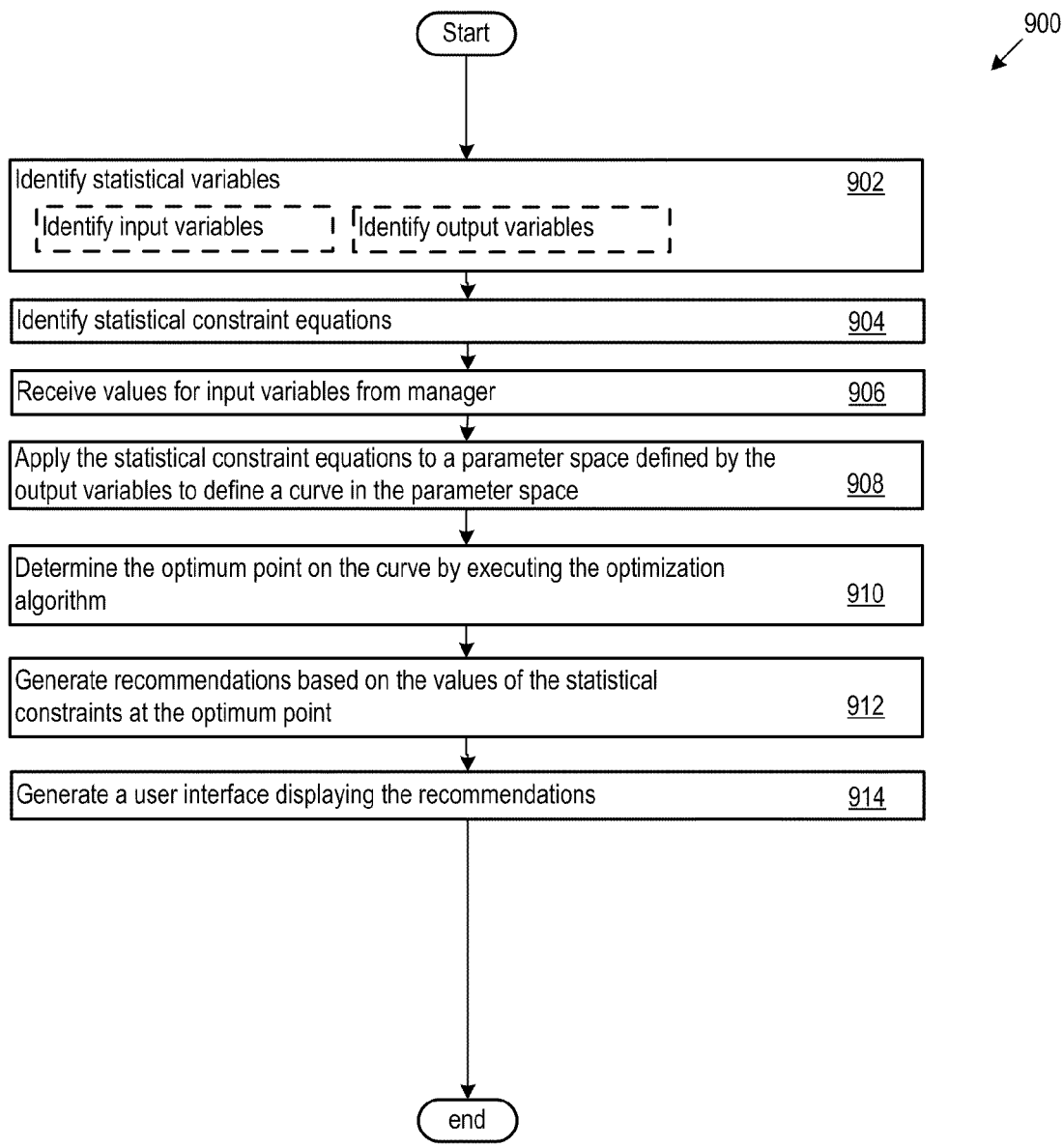
FIG. 9 shows a flow diagram of the logic that an optimization program in a GUI testing analysis system may execute.

FIG. 9 shows a flow diagram 900 of the logic the optimization program 140 may implement. The system 100 identifies the statistical variables 144, including the input and output variables 144 and 146 (902). The system 100 also identifies the statistical constraint equations 148 stored in the memory 104 (904). In one embodiment, the statistical constraint equations 148 stored in the memory 104 may include the following to setup specific relationships between input and output variables (e.g., based on past experience):

$$\frac{MTT \times NTEN}{NMT \times TSCT} = 24.75 \quad \text{Equation 1}$$

$$\frac{MTT \times NTEN}{NMT \times TSRT} = 19.43 \quad \text{Equation 2}$$

$$TSMT = TSCT \times 87\% \times (ER - 1) \quad \text{Equation 3}$$

$$MS = 2.19 \quad \text{Equation 4}$$

The statistical constraint equations 148, and the values to which they are set, may vary widely. The statistical constraint equations 148 and the values may be obtained from controlled experiments on prior test script testing projects, for example. However, they may also be preconfigured in the memory or obtained in other ways. After the statistical variables 144 and the statistical constraint equations 148 are configured or identified, the system 100 may then receive from values for each of the input variables 144 (906). The values for the input variables 144 may be workplace dependent, and may be input by managers of at the workplace. However, the values may also be preconfigured in the memory 104, received from other external entities, or obtained in many other ways.

Next, the system 100 applies the statistical constraint equations 148 to a parameter space defined by the output variables 146 to define a curve in the parameter space (908). The curve represents all the possible values of the output variables 146 as constrained by the values of the input variables 144 and the statistical constraint equations 148.

Next, the system 100 determines the optimum point on the curve defined in step 908 by executing the optimization algorithm 150 (910). The optimization algorithm 150 may determine an "optimum" point based on the value of the evaluation function 152 at a given point on the curve. While the "optimum" point may be a local maximum or minimum, in most cases the "optimum" point will be a global maximum or minimum. The system 100 may search for other types of "optimum" results, however. The evaluation function 152 may be defined to return values representing different goals depending on the purpose of the optimization program 140. For example, the goal of the optimization program 140 may be to determine the most efficient method of testing a GUI. In such a case, the evaluation function may be defined to return the value representing efficiency. The goal of the optimization program 140 may also be set to determine the least time-consuming method of testing a GUI. In such a case, the evaluation function may be defined to return the value representing time. The optimum point determined by the optimization algorithm 150 in this case will be a point on the curve associated with values of the statistical variables 146 which represents a testing approach which requires the least, or one of the least, amount of time to test the GUI and maintain the GUI testing tools.

Based on the optimum point determined by the optimization algorithm 150, the system 100 may generate the recommendation 154 (912). The system 100 may display the recommendation 154 on the user interface 132 of the display 130 (914). The recommendation may include values of some or all of the output variables 146 corresponding to the optimum point determined by the optimization algorithm 150. For example, as discussed above, the recommendation 154 may include values for the output variables TP, MP at the optimum point. The recommendation 154 may further include value of the variable TUP, representing whether to purchase ("0") or lease ("1") the GUI testing tools.

In one embodiment, the goal of the optimization program 140 may be set to determine the point on the curve which represents the least amount of cost for testing and maintaining the GUI. In this embodiment, the evaluation function 152 may be defined to represent the cost of conducting a GUI test given the values of the statistical variables 142 at a given point on the curve. FIG. 12 shows an exemplary mathematical equation 1200 of the evaluation function 152. The equation 1200 includes three optimization components. The first optimization component 1202 represents the cost of purely manual testing. The second optimization component 1204 represents the cost of automated testing with manual maintenance of the test script. The third optimization component 1206 represents the cost of automated testing with tool based maintenance of the test script. Thus, overall, the equation 1200 represents the cost for performing the GUI testing manually (optimization component 1202), for automated with manual test script maintenance (optimization component 1204), and for automated with tool based test script maintenance (optimization component 1206), and the optimization algorithm finds the minimum cost according to the three optimization components 1202, 1204 and 1206 that define the costs for the various testing scenarios. The equations 1200 may include additional, different or fewer testing scenarios by modifying the optimization components appropriately.

Figure 10:
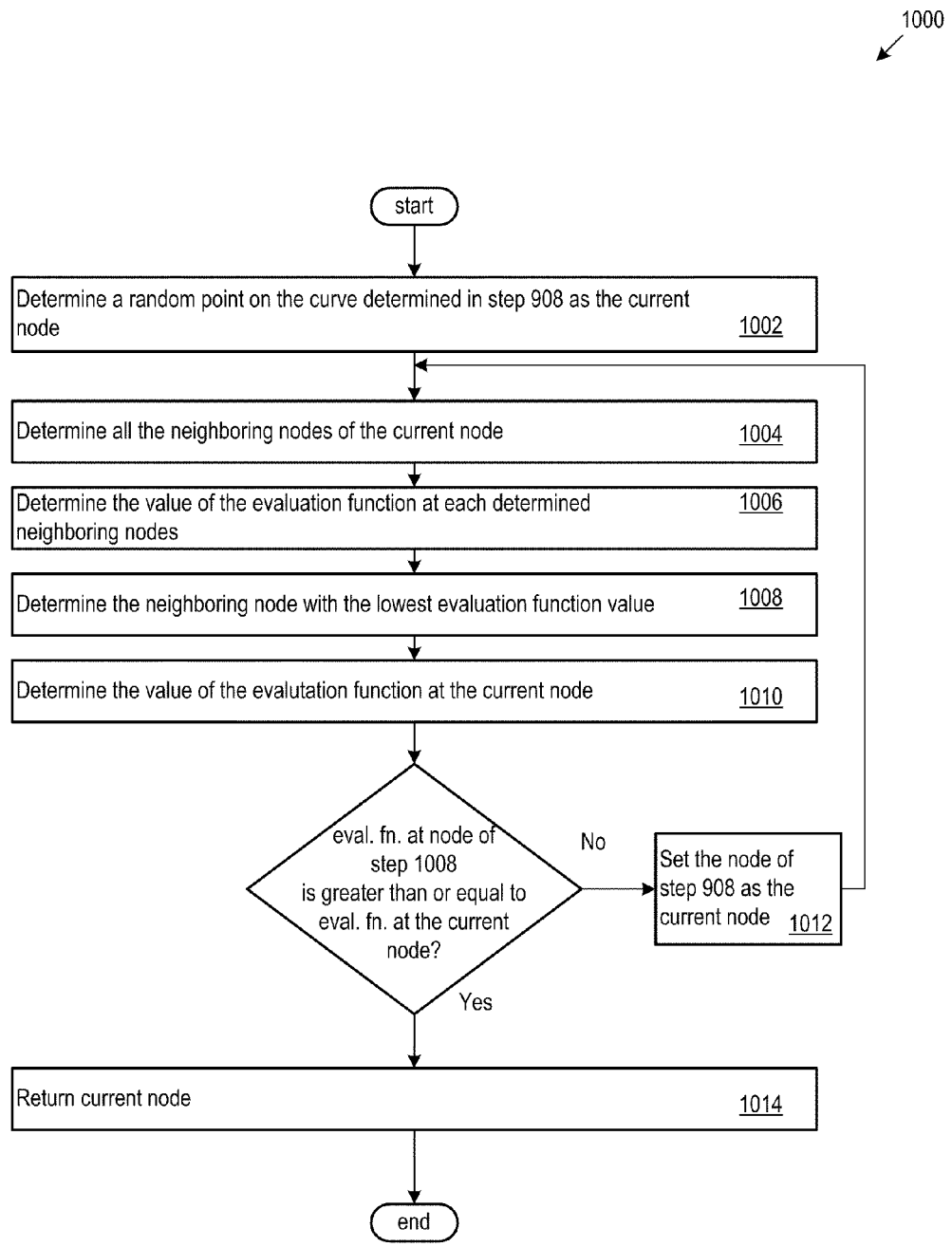
FIG. 10 shows a flow diagram of the logic that an optimization algorithm in the optimization program of FIG. 9 may execute.

FIG. 10 shows the logic 1000 that the optimization algorithm 150 may implement. The algorithm 150 first determines a random point on the curve defined in step 908 of FIG. 9 as the current node (1002). Next, the algorithm 150 determines one or more neighboring nodes of the current node (1004). At one or more of the neighboring nodes of the current node, the algorithm 150 determines the value of the evaluation function 152 (1006). Next, the algorithm 150 determines the neighboring node with the lowest evaluation function value (1008). Subsequently, the value of the evaluation function 152 at the current node is determined (1010), and the value is compared with that of the neighboring node determined in step 1008. If the evaluation function value of the node of step 1008 (lowest evaluation function value among the neighboring nodes) is less than the evaluation function value at the current node (e.g., the cost is less), the neighboring node with the lowest evaluation function value determined in step 1008 is set as the current node, and the algorithm 150 repeats from step 1004 (1012). If the evaluation function value of step 1008 (lowest evaluation function value from the neighboring nodes) is greater than or equal to the evaluation function value at the current node (e.g., the cost is greater), the optimization algorithm 150 returns the current node (1014).

FIG. 11 shows exemplary pseudo code 1100 for implementing the optimization algorithm 150 as represented by the logic 1000 of FIG. 10. The function NEIGHBORS (currentNode) 1102 returns as many neighboring nodes as desired, of the current node. The constant INF 104 represents the value infinity. The function EVAL(x) 1106 calls the evaluation function 152.

Thus, the system 100 helps reach a consensus regarding what approach testers should use to maintain test scripts. The system may help test managers avoid making their decisions ad hoc, based on their personal experience and perceived benefits of the tool-based approach versus the manual. As described above, the system 100 analyzes a case study (e.g., with forty five professional programmers and test engineers) to experimentally assess the automated approach for maintaining GUI-directed test scripts versus the manual approach. Based on the results of the case study and considering the high cost of the programmers' time and the lower cost of the time of test engineers, and considering that programmers often modify GAP objects in the process of developing software, the system 100 generates a recommendation. In particular, the system 100 may identify statistical variables including input and output variables, determine statistical constraint equations, and determine an evaluation function to be optimized. Based on the statistical constraint equations and values received for the input variables, the system 100 may generate recommendations by executing an optimization program with respect to the evaluation function The recommendation may indicate, as an example, that organizations supply programmers with testing tools that enable them to fix test scripts faster so that these scripts can unit test software. The other side of the recommendation may indicate that experienced test engineers are likely to be as productive with the manual approach as with the automated approach when fixing test scripts, and the system 100 may therefore recommend that organizations do not need to provide each tester with an expensive tool license to fix test scripts.

The implementation discussed above is exemplary. Other implementations may vary any of the equations, variables, parameters or characteristics noted above. For example, other implementations may use a different number of test GAPs, types of test scripts, types and number of hypotheses and tests used for hypotheses evaluation, number of test subjects, experience level of test subjects, confidence levels or other statistical analysis parameters, types or sequences of statistical tests applied, types of report outputs, types of statistical variables, statistical constraint equations, types of statistical variables included in the recommendation, or other characteristics. The statistical analysis program operates on any particular set of statistical analysis parameters obtained by running the tests, and analyzes them to generate results. The optimization program also operates on any particular set of statistical variables and determines recommendations based on the statistical constraint equations and values received for the input variables.

The system described above may be implemented in any combination of hardware and software. For example, programs provided in software libraries may provide the functionality that forms the hypotheses, obtains the input data, executes the statistical tests, generates output reports, obtains values for input variables, identifies the statistical variables, determines the statistical constraint equations, determine recommendations or other functions. Such software libraries may include dynamic link libraries (DLLs), or other application programming interfaces (APIs). The logic described above may be stored on a computer readable medium, such as a CDROM, hard drive, ROM or RAM, floppy disk, flash memory, or other computer readable medium. In addition, the system may be implemented as a particular machine. For example, the particular machine may include a CPU, GPU, and software library for carrying out the functionality that forms the hypotheses, obtains the input data, executes the statistical tests, generates output reports, obtains values for input variables, identifies the statistical variables, determines the statistical constraint equations, determine recommendations or other functions noted above. Thus, the particular machine may include a CPU, a GPU, and a memory that stores the logic described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for recommending graphical user interface (GUI) tools comprising:
    identifying statistical variables for evaluating allocation of testing resources for test scripts;
    partitioning the statistical variables into input variables and output variables; defining in a memory statistical constraint equations with at least some of the statistical variables;
    defining in the memory an evaluation function, with at least some of the statistical variables, for evaluating a testing cost of allocation of testing resources for test scripts, where the evaluation function determines, as the testing cost, a minimum value of:
        a first equation defining a first monetary cost of manual testing of a graphical user interface (GUI), the first equation comprising a first subset of the statistical variables;
        a second equation representing a second monetary cost of automated testing of the GUI with manual maintenance, the second equation comprising a second subset of the plurality of statistical variables; and
        a third equation representing a third monetary cost of automated testing of the GUI with tool based maintenance, the third equation comprising a third subset of the plurality of statistical variables;
    executing with a processor coupled to the memory an optimization program stored in the memory,
    the optimization program comprising instructions that when executed cause the processor to:
        obtain a workplace dependent value for each of the input variables apply the constraint equations to a parameter space defined by the output variables to define a curve in the parameter space;
        execute an optimization algorithm to obtain an optimum point on the curve that achieves a defined goal for the evaluation function;
        determine a recommendation based on the optimum point; and
        store the recommendation in the memory.

2. The method of claim 1, where the optimization algorithm determines the optimum point on the curve based on returned values of the evaluation function.

3. The method of claim 1, where the evaluation function determines, as the testing cost, a minimum value of: a first equation defining a manual testing cost;
    and a second equation defining an automated testing cost.

4. The method of claim 1, where the statistical variables include any one or more of:
    manual testing time (MTT), number of test engineers needed (NTEN), number of manual testers needed (NMT), test script composition time (TSCT), test script running time (TSRT), test script maintenance time (TSMT), and tool based maintenance speed up factor (MS), and the statistical constraint equations comprise any one or more of MTT, NTEN, NMT, TSCT, TSRT, and TSMT.

5. The method of claim 4, where the statistical constraint equations include any one or more of:

$$\frac{MTT \times NTEN}{NMT \times TSCT};$$
$$\frac{MTT \times NTEN}{NMT \times TSRT};$$
$$TSMT = TSCT \times 87\% \times (ER - 1); \text{ and}$$
$$MS.$$

6. The method of claim 5, where any one or more of the constraint equations are set to constrain values obtained from controlled experiments on prior test script testing projects.

7. A system for recommending graphical user interface (GUI) tools comprising:
    a processor; and
    stored on a computer readable memory coupled to the processor:
        statistical variables for evaluating allocation of testing resources for test scripts, the statistical variables partitioned into input variables and output variables;
        statistical constraint equations with at least some of the statistical variables;
        an evaluation function, with at least some of the statistical variables, for evaluating a testing cost of allocation of testing resources for test scripts, where the evaluation function determines, as the testing cost, a minimum value of:
            a first equation defining a first monetary cost of manual testing of a graphical user interface (GUI), the first equation comprising a first subset of the statistical variables;
            a second equation representing a second monetary cost of automated testing of the GUI with manual maintenance, the second equation comprising a second subset of the plurality of statistical variables; and
            a third equation representing a third monetary cost of automated testing of the GUI with tool based maintenance, the third equation comprising a third subset of the plurality of statistical variables;
        an optimization program comprising instructions that when executed cause the processor to:
            obtain a workplace dependent value for each of the input variables apply the constraint equations to a parameter space defined by the output variables to define a curve in the parameter space;
            execute an optimization algorithm to obtain an optimum point on the curve that achieves a defined goal for the evaluation function;
            determine a recommendation based on the optimum point; and
            store the recommendation in the memory.

8. The system of claim 7, where the optimization algorithm determines the optimum point on the curve based on returned values of the evaluation function.

9. The system of claim 7, where the evaluation function determines, as the testing cost, a minimum value of:
    a first equation defining a manual testing cost; and
    a second equation defining an automated testing cost.

10. The system of claim 7, where the statistical variables include any one or more of:
manual testing time (MTT), number of test engineers needed (NTEN), number of manual testers needed (NMT), test script composition time (TSCT), test script running time (TSRT), test script maintenance time (TSMT), and tool based maintenance speed up factor (MS), and the statistical constraint equations comprise any one or more of MTT, NTEN, NMT, TSCT, TSRT, and TSMT.

11. The system of claim 10, where the statistical constraint equations include any one or more of:

$$\frac{MTT \times NTEN}{NMT \times TSCT};$$

$$\frac{MTT \times NTEN}{NMT \times TSRT};$$

$$TSMT = TSCT \times 87\% \times (ER - 1); \text{ and}$$

$$MS.$$

12. The system of claim 11, where any one or more of the constraint equations are set to constrain values obtained from controlled experiments on prior test script testing projects.

13. An article of manufacture, comprising:
a computer readable non-statutory medium; and
stored on the computer readable medium:
statistical variables for evaluating allocation of testing resources for test scripts, the statistical variables partitioned into input variables and output variables;
statistical constraint equations with at least some of the statistical variables;
an evaluation function, with at least some of the statistical variables, for evaluating a testing cost of allocation of testing resources for test scripts, where the evaluation function determines, as the testing cost, a minimum value of:
a first equation defining a first monetary cost of manual testing of a graphical user interface (GUI), the first equation comprising a first subset of the statistical variables;
a second equation representing a second monetary cost of automated testing of the GUI with manual maintenance, the second equation comprising a second subset of the plurality of statistical variables; and
a third equation representing a third monetary cost of automated testing of the GUI with tool based maintenance, the third equation comprising a third subset of the plurality of statistical variables;
an optimization program comprising instructions that when executed cause a processor to:
obtain a workplace dependent value for each of the input variables apply the constraint equations to a parameter space defined by the output variables to define a curve in the parameter space;
execute an optimization algorithm to obtain an optimum point on the curve that achieves a defined goal for the evaluation function;
determine a recommendation based on the optimum point; and
store the recommendation in the memory.

14. The article of manufacture of claim 13, where the optimization algorithm determines the optimum point on the curve based on returned values of the evaluation function.

15. The article of manufacture of claim 13, where the evaluation function determines, as the testing cost, a minimum value of: a first equation defining a manual testing cost; and a second equation defining an automated testing cost.

16. The article of manufacture of claim 13, where the statistical variables include any one or more of:
manual testing time (MTT), number of test engineers needed (NTEN), number of manual testers needed (NMT), test script composition time (TSCT), test script running time (TSRT), test script maintenance time (TSMT), and tool based maintenance speed up factor (MS), and the statistical constraint equations comprise any one or more of MTT, NTEN, NMT, TSCT, TSRT, and TSMT.

17. The article of manufacture of claim 16, where the statistical constraint equations include any one or more of:

$$\frac{MTT \times NTEN}{NMT \times TSCT};$$

$$\frac{MTT \times NTEN}{NMT \times TSRT};$$

$$TSMT = TSCT \times 87\% \times (ER - 1); \text{ and}$$

$$MS.$$

* * * * *